United States Patent
Zhou et al.

(10) Patent No.: US 10,834,214 B2
(45) Date of Patent: Nov. 10, 2020

(54) SEPARATING INTENDED AND NON-INTENDED BROWSING TRAFFIC IN BROWSING HISTORY

(71) Applicant: AT&T Intellectual Property I, L.P., Atlanta, GA (US)

(72) Inventors: Zhengyi Zhou, Astoria, NY (US); Christopher Volinsky, Morristown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 49 days.

(21) Appl. No.: 16/120,748

(22) Filed: Sep. 4, 2018

(65) Prior Publication Data

US 2020/0076906 A1 Mar. 5, 2020

(51) Int. Cl.
| | |
|---|---|
| *H04L 29/08* | (2006.01) |
| *G06F 16/28* | (2019.01) |
| *G06F 16/955* | (2019.01) |
| *G06F 16/23* | (2019.01) |
| *H04L 29/06* | (2006.01) |

(Continued)

(52) U.S. Cl.
CPC .......... *H04L 67/22* (2013.01); *G06F 16/2365* (2019.01); *G06F 16/285* (2019.01); *G06F 16/955* (2019.01); *H04L 63/101* (2013.01); *H04W 12/08* (2013.01)

(58) Field of Classification Search
CPC ....... H04L 67/22; H04L 63/101; H04L 67/02; H04L 43/00; G06F 16/955; G06F 16/285; G06F 16/2365; H04W 12/08
See application file for complete search history.

(56) References Cited

U.S. PATENT DOCUMENTS

| | | |
|---|---|---|
| 6,853,982 B2 | 2/2005 | Smith et al. |
| 7,584,287 B2 | 9/2009 | Schneider et al. |

(Continued)

FOREIGN PATENT DOCUMENTS

| | | |
|---|---|---|
| WO | 2013/066755 A1 | 5/2013 |
| WO | 2014/146755 A1 | 9/2014 |

(Continued)

OTHER PUBLICATIONS

Weth et al., "Dobbs: Towards a Comprehensive Dataset to Study the Browsing Behavior of Online Users," Deri Technical Report, 2013, 24 pages.

(Continued)

*Primary Examiner* — Arvin Eskandarnia
*Assistant Examiner* — Chhian (Amy) Ling
(74) *Attorney, Agent, or Firm* — Amin, Turocy & Watson, LLP

(57) ABSTRACT

Facilitating separation of intended and non-intended browsing traffic in browsing history advanced networks (e.g., 4G, 5G, and beyond) is provided herein. Operations of a system can comprise determining respective contradiction values for second-level domains of a group of second-level domains in observed browsing history traffic. The operations can also comprise separating intended network traffic from non-intended network traffic based on the respective contradiction values. The respective contradiction values can indicate levels of inconsistency between the observed browsing history traffic and a determined popularity ranking.

20 Claims, 10 Drawing Sheets

(51) Int. Cl.
*H04W 12/06* (2009.01)
*H04L 12/26* (2006.01)
*H04W 12/08* (2009.01)

(56) References Cited

U.S. PATENT DOCUMENTS

| | | | |
|---|---|---|---|
| 7,624,173 | B2 | 11/2009 | Bary et al. |
| 7,966,310 | B2 * | 6/2011 | Sullivan .............. G06F 16/9566 |
| | | | 707/709 |
| 8,356,097 | B2 | 1/2013 | Cancel et al. |
| 8,380,870 | B2 | 2/2013 | Smith et al. |
| 8,504,673 | B2 | 8/2013 | Thomas |
| 8,719,364 | B2 | 5/2014 | Kita et al. |
| 8,776,224 | B2 | 7/2014 | Krishnamurthy et al. |
| 8,788,490 | B1 | 7/2014 | Chatra et al. |
| 8,818,927 | B2 | 8/2014 | Ruf et al. |
| 8,954,539 | B2 | 2/2015 | Lahav |
| 9,769,035 | B2 | 9/2017 | Holmes et al. |
| 9,832,209 | B1 | 9/2017 | Cooley et al. |
| 2002/0016731 | A1 | 2/2002 | Kupersmit |
| 2006/0015390 | A1 | 1/2006 | Rijsinghani et al. |
| 2007/0276940 | A1 | 11/2007 | Abraham et al. |
| 2009/0132334 | A1 | 5/2009 | Wang et al. |
| 2012/0084423 | A1 | 4/2012 | McGleenon |
| 2012/0317151 | A1 | 12/2012 | Ruf et al. |
| 2013/0268357 | A1 | 10/2013 | Heath |
| 2016/0337378 | A1 * | 11/2016 | Wan ........................ H04L 63/14 |
| 2017/0251013 | A1 * | 8/2017 | Kirti ................... H04L 63/1416 |
| 2017/0295134 | A1 * | 10/2017 | Isenberg ............. H04L 63/1425 |
| 2017/0364949 | A1 | 12/2017 | Vandusen et al. |
| 2018/0343272 | A1 * | 11/2018 | Khalil ................. H04L 63/1425 |
| 2020/0019644 | A1 * | 1/2020 | Mazouchi .............. G06N 20/00 |

FOREIGN PATENT DOCUMENTS

| | | |
|---|---|---|
| WO | 2016/085412 A1 | 6/2016 |
| WO | 2017/177591 A1 | 10/2017 |
| WO | 2018/047027 A1 | 3/2018 |

OTHER PUBLICATIONS

Hao et al., "An Internet-Wide View into DNS Lookup Patterns," 2010, 6 pages.
Almishari et al., "Ads-Portal Domains: Identification and Measurements," ACM Transactions on the Web, Apr. 2010, vol. 4, No. 2, Article 4, 34 pages.
Fredrikson et al., "REPRIV: Re-Imagining Content Personalization and In-Browser Privacy," IEEE Symposium on Security and Privacy (SP), 2011, IEEE, 16 pages.
Baviskar et al., "Protection of Web User's Privacy by Securing Browser from Web Privacy Attacks," International Journal of Computer Technology and Applications, 2011, pp. 1051-1057, vol. 2, No. 4, 8 pages.
eMarketer, "eMarketer Updates Worldwide Internet and Mobile User Figures," 2017, 4 pages.
Comscore, "The US Mobile App Report," 2014, 3 pages.
The Atlantic, "Welcome to the Internet of Thingies: 61.5% of Web Traffic is Not Human," 2013, 9 pages.
Libert, "Exposing the Hidden Web: An Analysis of Third-Party HTTP Requests on One Million Websites," International Journal of Communication, Oct. 2015, 10 pages.
Webxray, "webxray" 7 pages. Retrieved on Dec. 4, 2018. http://webxray.org/.
Mozilla, "Firefox Lightbeam," 9 pages. Retrieved on Dec. 4, 2018. https://addons.mozilla.org/en-US/firefox/addon/lightbeam/.
Diconnect.me, "Disconnect," 1 page. Retrieved on Dec. 4, 2018. https://chrome.google.com/webstore/detail/disconnect/jeoacafpbcihiomhlakheieifhpjdfeo?hl=en.
"Blocklist of hostnames and domains for blocking ads, trackers and others", yoyo.org, 39 pages. Retrieved on Dec. 4, 2018. https://pgl.yoyo.org/adservers/serverlist.php?showintro=0;hostformat=hosts.
Internet World Stats, "Internet Usage Statistics", 7 pages. Retrieved on Dec. 4, 2018. http://www.internelworldstats.com/stats.htm.

* cited by examiner

SEPARATING INTENDED AND NON-INTENDED BROWSING TRAFFIC IN BROWSING HISTORY

TECHNICAL FIELD

This disclosure relates generally to the field of network communication and, more specifically, to mining user internet browsing history data for various purposes in wireless communication systems for advanced networks (e.g., 4G, 5G, and beyond).

BACKGROUND

Internet usage, especially through mobile devices, has been significantly increasing. A vast amount of data related to the internet usage is available and can be utilized to learn information about the users that are accessing the Internet. Therefore, unique challenges exist to provide levels of service and relevant information associated with the data related to the internet usage.

BRIEF DESCRIPTION OF THE DRAWINGS

Various non-limiting embodiments are further described with reference to the accompanying drawings in which.

DETAILED DESCRIPTION

Figure 1:
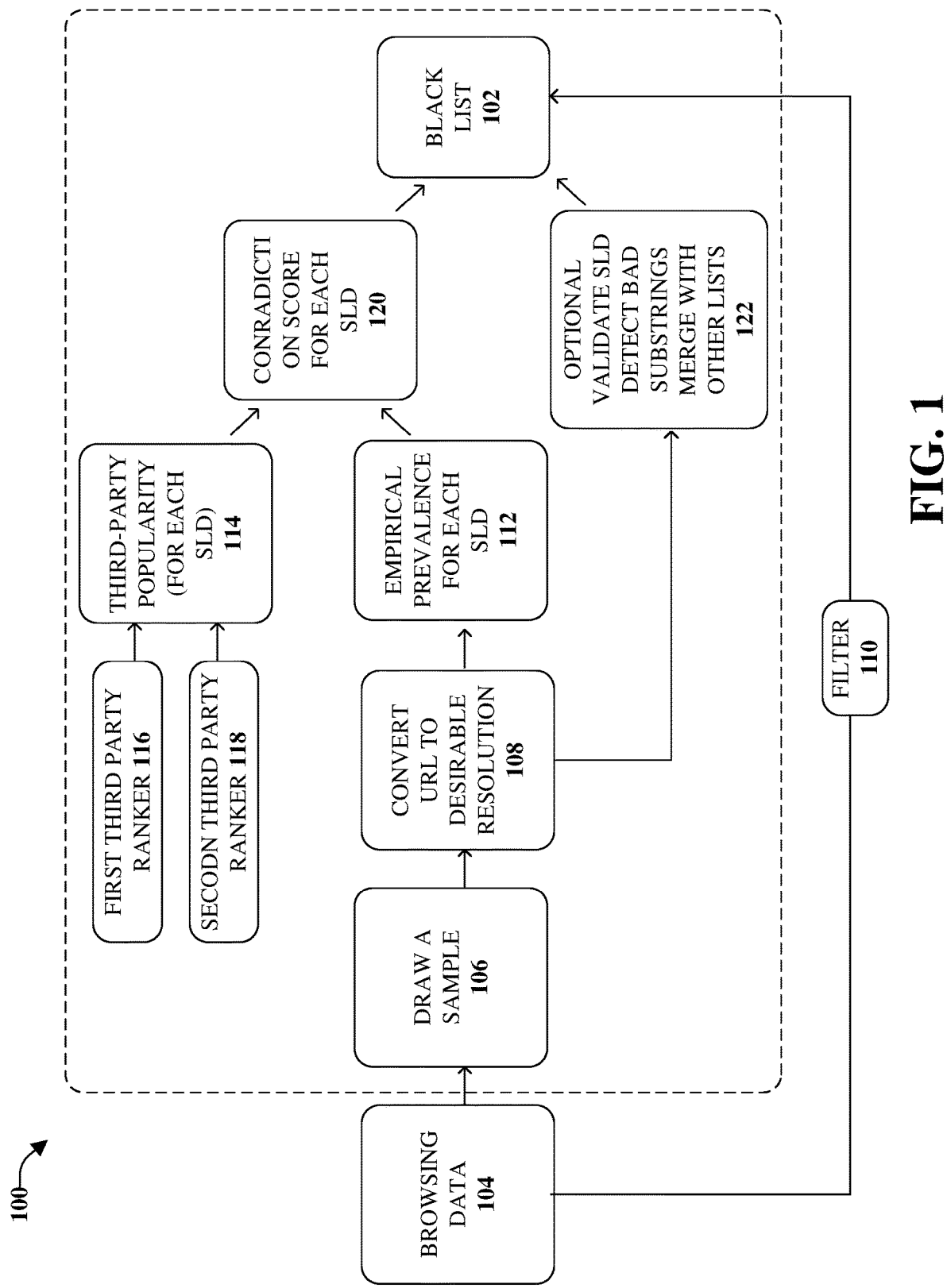
FIG. 1 illustrates an example, non-limiting, system in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, methods, articles of manufacture, and other embodiments or implementations that can facilitate separating user-intended and non-user intended browsing traffic in user browsing history data. In one embodiment, described herein is a system that can comprise a processor and a memory that stores executable instructions that, when executed by the processor, facilitate performance of operations. The operations can comprise determining respective contradiction values for second-level domains of a group of second-level domains in observed browsing history traffic. The operations can also comprise separating intended network traffic from non-intended network traffic based on the respective contradiction values. The respective contradiction values can indicate levels of inconsistency between the observed browsing history traffic and a determined popularity ranking.

According to an implementation, separating the intended network traffic from the non-intended network traffic can comprise identifying a second-level domain of the group of second-level domains as the non-intended network traffic. The identification can be based on a contradiction value for the second-level domain being determined to be above a threshold level. Further to this implementation, the operations can comprise adding the second-level domain to a list of identified non-intended domains and utilizing the list to facilitate the separating the intended network traffic from the non-intended network traffic.

Determining the respective contradiction values can comprise, according to an implementation, evaluating respective popularities of the second-level domains and associated subdomains in the observed browsing history data and respective third-party popularity rankings of the second-level domains.

In accordance with some implementations, the operations can comprise initiating a network connection with a second level domain selected from the group of second-level domains. Further, the operations can comprise determining the second level domain is a valid second level domain based on a successful network connection with the second level domain.

According to some implementations, the operations can comprise initiating a network connection with a second level domain selected from the group of second-level domains. The operations can also comprise determining the second level domain is an invalid second level domain based on an unsuccessful network connection with the second level domain. Further, the operations can comprise adding the second level domain to a list of identified non-intended domains. The list can be utilized to facilitate the separating the intended network traffic from the non-intended network traffic.

The operations can comprise, according to some implementations, identifying a second level domain as an intended domain. Further, the operations can comprise adding the second level domain to a list of second level domains that are exempted from being identified as non-intended domains.

In some implementations, the operations can comprise generating a list of substrings and identifying a second level domain as a non-intended domain based on a determination that the second level domain comprises a substring included in the list of substrings.

According to some implementations, the operations can comprise including a second-level domain of the group of second-level domains to a list of identified non-intended domains. Further, the operations can comprise merging a third party created list of non-intended domains to the list of identified non-intended domains.

The observed browsing history traffic can be a sample of available browsing history traffic. In these implementations, the operations can comprise including the second-level domains associated with the non-intended network traffic in a first data store and the second-level domains associated with the intended network traffic in a second data store. Further, the operations can comprise applying the first data store and the second data store to other available browsing history traffic not including the sample of available browsing history traffic. In addition, the operations can comprise separating the other available browsing history traffic into the intended network traffic and the non-intended network traffic.

In an example, the non-intended network traffic can comprise third-party requests. In an additional or alternative example, the non-intended network traffic can comprise passive system requests.

Another embodiment relates to a method that can comprise evaluating, by a system comprising a processor, respective contradiction scores for second-level domains of a group of second-level domains of observed browsing history traffic. The method can also comprise identifying, by the system, intended network traffic and non-intended network traffic of the observed browsing history traffic based on the respective contradiction scores. The respective contradiction scores can indicate a level of inconsistency between the observed browsing history traffic and an external popularity ranking.

The observed browsing history traffic can be first observed browsing history traffic and the method can comprise generating, by the system, a first list that comprises second level domains associated with the intended network traffic and a second list that comprises the second level domains associated with the non-intended network traffic. The method can also comprise separating, by the system, second level domains of second observed browsing history traffic based on an application of the first list and the second list to the second observed browsing history traffic.

In some implementations, the method can comprise identifying, by the system, a first second-level domain of the group of second-level domains as intended network traffic based on a first contradiction score of the respective contradiction scores not satisfying a threshold value. Further, the method can comprise identifying, by the system, a second second-level domain of the group of second-level domains as the non-intended network traffic based on a second contradiction score of the respective contradiction scores satisfying the threshold value.

According to some implementations, the evaluating the respective contradiction scores can comprise evaluating respective popularities of the second-level domains and associated subdomains in the observed browsing history data and respective external popularity rankings of the second-level domains.

The method can comprise, according to some implementations, generating, by the system, a list of substrings and identifying, by the system, a second level domain as a non-intended domain based on a determination that the second level domain comprises a substring included in the list of substrings.

In some implementations, the method can comprise including, by the system, a second-level domain of the group of second-level domains in a list of identified non-intended domains. Further, the method can comprise merging, by the system, an external list of non-intended domains to the list of identified non-intended domains.

According to another example, the method can comprise initiating a network connection with a second level domain selected from the group of second-level domains. The method can also comprise determining the second level domain is a valid second level domain based on a successful network connection with the second level domain or is an invalid second level domain based on an unsuccessful network connection with the second level domain. Further, the method can comprise adding the invalid second level domain to a list of identified non-intended domains, wherein the list is utilized to facilitate the separating the intended network traffic from the non-intended network traffic.

In accordance with another example, the method can comprise initiating a network connection with a second level domain selected from the group of second-level domains. Further, the method can comprise determining the second level domain is an invalid second level domain based on an unsuccessful network connection with the second level domain. In addition, the method can comprise adding the second level domain to a list of identified non-intended domains, wherein the list is utilized to facilitate the separating the intended network traffic from the non-intended network traffic.

In yet another example, the method can comprise identifying a second level domain as an intended domain. The method can also comprise adding the second level domain to a list of second level domains that are exempted from being identified as non-intended domains.

A further, embodiment relates to a machine-readable storage medium, comprising executable instructions that, when executed by a processor, facilitate performance of operations. The operations can comprise determining, for a first device selected from a group of devices in a wireless network, first domains of first browsing history traffic. The operations can also comprise identifying the first domains as a first group of domains and a second group of domains. The first group of domains can comprise domains associated with intentional network traffic. The second group of domains can comprise domains associated with unintentional network traffic. Further, the operations can comprise applying the first group of domains and the second group of domains to second browsing history traffic associated with a second device selected from the group of devices.

In some implementations, the operations of the machine-readable storage medium can comprise generating a whitelist that comprises the first group of domains and a blacklist that comprises the second group of domains. Further, the operations can comprise applying the whitelist and the blacklist to devices in the group of devices, including the second device.

Increasing internet usage (especially usage through mobile devices) presents the opportunity to mine user browsing history data for various commercial products. To effectively identify user behaviors and interests, browsing traffic that users actively intend to request should be identified. The various aspects discussed herein can filter out non-user-intended traffic, such as third-party requests and/or passive system requests (e.g., ads, geo-positioning), which are present in large proportions (e.g., around 80% to about 90% or more) in browsing history of various devices (e.g., mobile devices, desktop devices, laptop devices, and other User Equipment (UE)). By identifying and filtering out the non-user-intended traffic, a much smaller but more informative set of browsing activities can be revealed for better understanding of users. Without the filtering, insights gathered from naive post-hoc analysis of raw browsing data may not be accurate.

The various aspects discussed herein can greatly increase the usability and value of a set of browsing data and can enhance various applications or products that derive intelligence from such data. Examples of applications and/or products include, but are not limited to, user segmentation and profiling, targeted advertising, content and/or product recommendation, and content storage and delivery optimization. Entities that can benefit from the disclosed aspects include, but are not limited to, entities that own or collect browsing data and are interested in developing data products that have higher values than the raw browsing data; telecommunication entities interested in optimizing content delivery through networks; entities that own and deliver content and are interested in optimizing content recommendation, storage, and delivery; and entities that are interested in targeted advertising or recommendation of content, product, event, and so on; such advertising or recommendation can also be implemented cross-platform.

As internet usage and penetration (especially usage through mobile devices) continues to increase rapidly in the next few years (especially fast in some countries), more entities will come to practice and value browsing data mining for an increasingly wider array of applications and products. The disclosed aspects can be utilized to considerably boost their capabilities to do so. Traditional methods either give very partial solutions to this filtering problem or require user-side access, which can be expensive and intrusive. The disclosed aspects can provide a complete filtering solution, filtering out non-user-intended traffic in proportions consistent with external and internal experiments and studies. Further, the disclosed aspects do not need user-side access or action. The disclosed aspects also do not need manual annotation, labeling, or extensive experimentation. The disclosed aspects can be robust to coarse aggregation or recording of times and domains in the browsing data and can be easily adapted to desktop/laptop browsing traffic or browsing traffic from other countries. Further, the disclosed aspects can provide output filtering lists that can be easily computed, updated, interpreted, and customized for different use cases.

The number of internet users worldwide has increased 6.1% in 2017 compared to 2016, and nearly four in five use a mobile phone to access the internet. In the United States, internet usage through mobile devices has overtaken the amount of internet usage through desktops/laptops in 2014, both in number of users and time spent using the internet. This has led to great potential and challenges in targeting advertising, content recommendation, content storage, and delivery optimization. Mining user browsing history data provides an essential pathway for such applications.

However, to effectively identify user behaviors and interests, browsing traffic that users actively intend to request should be identified. Such user-intended traffic is only present in small proportions (around 10% to about 20%) in both mobile and desktop/laptop browsing history data. The remaining majority of the history consists of a large amount of collateral third-party requests and/or passive system requests (further details will be provided below with respect to explanations of non-user-intended traffic), which are not nearly as insightful about user behaviors and interests.

The various aspects can separate user-intended and non-user-intended traffic from user browsing history data. This can be useful for better modeling of user behaviors and interests, and better results in applications such as targeted advertising and content delivery. The various aspects were developed using mobile browsing history data from the United States, although the same aspects can be easily extended to desktop/laptop browsing data and/or browsing data from other countries. It is that this separation is different in nature from the separation of human and non-human browsing traffic. Non-human traffic, for example, can be automated visitation traces generated by bots and crawlers that are not controlled by individual users. This is also different in nature from identifying domains that are malicious or pose some security threats. The various aspects look within all browsing traces generated by personal devices, regardless of whether malicious, and filtering based on whether requests are actively intended by users and helpful for uncovering user interests.

Non-user intended traffic includes third-party requests and/or passive system requests. Third-party requests can occur when a user makes an HTTP (hypertext transfer protocol) request to load a webpage (e.g. example_domain.com), it receives an HTML file from the server associated with its domain. Direct transactions with this intended server owned by example_domain can be referred to as "first-party" requests. However, the webpage can include additional elements, such as pictures, videos, or Javascript code, from parties external to the intended server of example_domain, and loading of such additional elements are "third-party" requests. External companies can pay or offer free services to example_domain to have their elements displayed on its page. These third-party elements can be advertisements, traffic trackers, social media tools, etc.

It has been estimated that about 90% of the top million domains initiate requests to on average 9.5 distinct third-parties on desktop/laptop, mostly through invisible elements on the webpages. This suggests the proportion of third-party requests out of all requests is very high at roughly around 80-90%. This quantity also aligns with various testing and experiments for mobile browsing. Such a large volume of third-party requests considerably masks and dilutes the users' true browsing intentions.

Passive system requests can occur when a device's operating system or various applications may initiate a large volume of maintenance and utility requests without active or explicit interactions with the user, for location positioning, periodically checking, uploading, or downloading software or content, and so on, for example. Most of this type of traffic does not contain much information about the users' active browsing interests or behaviors.

Referring initially to FIG. 1, illustrated is an example, non-limiting, system 100 in accordance with one or more embodiments described herein. Repetitive description of like elements employed in other embodiments described herein is omitted for sake of brevity. To create a blacklist 102, samples with Second Level Domains (SLDs) can be generated and contradiction scores can be determined. Optionally, the SLDs can be validated, SLDs can be exempted, bad substrings can be determined, and/or merged with external lists.

In further detail, to generate samples with SLDs, browsing history data 104 from one or more mobile devices can be received. For example, the browsing history data can be received as production data feed to a central database or to multiple databases, which can be distributed databases. The feed can be processed to ensure user privacy, with encryption of MSISDNs and coarse aggregation of timestamps (e.g., every 5 minutes) and domains (e.g., shortened Uniform Resource Locators (URLs) to second-level domains, or one- or two-level lower only).

The various aspects can be implemented on a sample of this data (e.g., sample data 106) that is sufficiently large to be representative of traffic of all devices. For example, the sample data 106 can represent, at a minimum, one month of usage for 1% of all devices. The shortened URLs in this sample can be converted 108 to its corresponding SLDs. Once a blacklist 102 is generated from this sample, it can be applied to filter 110 the entire feed.

A determination can be made whether visits to an SLD is likely to be actively intended by users or is likely to be activity not intended by users. For example, for each SLD, a score can be computed based on at least two factors, namely, empirical prevalence 112 and third-party popularity ranking 114. The empirical prevalence p relates to how popular a particular SLD and its subdomains are based on the browsing data. The third-party popularity ranking r relates to how a particular SLD ranks in terms of popularity according to one or more third-party sources (e.g. Quantcast, Alexa). Further details related to these two factors and how the score is determined based on these factors will be provided below.

As it relates to empirical prevalence p, for each SLD, this is the percentage of devices that have at least one request for this domain or any of its subdomains. This captures the "reach" of this SLD in the device pool. This quantity is usually very large for advertisement aggregators, CDNs, traffic generated by operating systems, and very popular sites. This metric has a very long tail and may follow the power law.

As it relates to third-party popularity ranking r, some third-parties publish rankings of SLDs by popularity. These rankings primarily aim to rank user-intended traffic. For popular domains that users visit often, the ranking numerical quantities are typically low (e.g. ranking 1 or 2). For domains of ad aggregators, CDNs, or OS providers, the ranking numerical quantities are typically high (e.g. ranking 97638), or they don't appear on the ranking list at all.

The following are additional notes related to third-party popularity ranking r. A first third-party ranker 116 can publish the top around 90,000 domains by popularity, and a second third-party ranker 118 can publish the top million. Both lists can be downloaded for free. Both lists are updated fairly often, but typically there is no substantial difference from day to day and the lists can be updated at longer intervals (e.g., about every 3 months). Both rankings are for desktop/laptop usage. Mobile usage can have a slightly different pattern. A third-party ranker might also provide a much shorter list specific to mobile usage. Further, one third-party ranker can provide a list that is more geared towards the United States population (although it also provides shorter lists for some other countries), while a list provided by another third-party ranker is more international. In some cases, a list can include a non-trivial number of "Hidden Profiles" where the domain name is hidden (e.g., missing). Both lists, to a small degree, still rank some domains from ad aggregators, CDNs, OS providers, although they typically do not rank these domains as very high (not nearly as high as what was observe from experimental data). On this front, the lists can have different levels of quality.

At least in part due to the above, the two lists can be unioned (or combined) when the third-party popularity ranking r is constructed. When merging, a first list can be considered the primary list; domains not listed in the first list (because of, for example, Hidden profile, having a more international audience) but are listed in a second list are joined to the first list, along with a ranking of the second list.

A contradiction score 120 can be determined. For each SLD, its contradiction score is computed as $p*r\hat{\;}a$, where p is its empirical prevalence, r is its third-party popularity ranking, and a is a constant between 0 and 1 set uniformly across all SLDs. This score is designed so that only domains heavily visited by nonuser-intended traffic gives high contradiction scores. It is noted that the contradiction score 120 provided is merely an example formula and many other functions relating to two quantities p and r are possible, provided that such functions distinguish the case where p is large and r is large. The following explains at least four scenarios.

A domain with many visits mostly intended by users has a large p and a small r. Therefore, the contradiction score is low. A domain with few visits mostly intended by users has a small p and a large r and, thus, the contradiction score is low. A domain with many visits mostly not intended by users has a large p and a large r and the contradiction score is high—this is the case that the disclosed aspects are intended to identify. A domain with few visits mostly not intended by users has a small p and a small r and, therefore, the contradiction score is low. This fourth case is rare because many ad/analytics/OS domains have or try to have large reach in users and large volumes of traffic in order to stay competitive in its market.

A cutoff of this contradiction score (e.g., a threshold level) can be decided. Thus, all domains whose contradiction scores are higher than this cutoff are included in the output blacklist.

The constant a is a number between 0 and 1 that aims to dampen the impact of third-party popularity ranking in the computation of contradiction score. This is motivated by the fact that r is not perfect in quality; a number of ad/analytics domains are ranked in the third-party rankings although their rankings are not very high. In the implemented version, a is taken to be 0.5 for all SLDs. Changing values of a does not substantially change the output blacklist, although the cutoff of contradiction score for what to include in the blacklist may need to be adjusted.

If a domain is not on the third-party ranking list, the domain could be assigned a nominal ranking (e.g. 1,000,001). Mathematically equivalently, a cutoff could be imposed on its p value alone to decide whether this domain would be included in the blacklist.

The cutoff can be determined by inspection. The cutoff point can be set roughly to where there starts to be more domains with mostly user-intended traffic than those with mostly non-user-intended traffic. In an implementation, the default value of 10.1 can be utilized, as an example. If the number of users and date range for the sample or the value of a is changed, this cutoff may need to be adjusted.

This cutoff may need to be tuned a very small number of times a year by looking at the tail of the blacklist generated. A machine learning classifier can be built to automate this decision, using information such as past blacklist memberships, memberships in external lists, and/or the fact that the disclosed aspects are aiming to filter around 80 to 90 percent of the traffic.

The cleaning process might not be as sensitive to this cutoff. The head of the blacklist (e.g., domains with the highest contradiction scores) are the main culprits in generating the largest amounts of non-user-intended traffic, and domains near the tail of the blacklist typically do not get nearly as much volume and reach.

There are at least four optional implementations, indicated at 122, and any subset, or all, of the at least four optional implementations can be added to the blacklist construction route. These optional implementations include validate SLDs, exempt SLDs, detect bad substrings, and/or combine with external lists. Further details related to these optional implementations will be discussed below with respect to FIGS. 5-8.

The blacklist can be updated continuously, continually, periodically, at variable intervals, or based on a parameter (e.g., at least a set of the data has changed, new data has been entered, a query has been executed on the data, and so forth). In one specific, non-limiting example, the blacklist can be updated every three months. To filter traffic in the browsing history data based on a blacklist, each shortened URL obtained, u, can be matched with each SLD on the blacklist, b, by "lower level domain match" (e.g., either an exact match, or b with a dot prepended is a substring of u).

There can also be standalone code for validating SLD and converting shortened (or any) URL to its SLD. There can also be a curated list of bad substrings to detect and a list of domains to exempt, which can be specific to some use cases.

Methods that can be implemented in accordance with the disclosed subject matter, will be better appreciated with reference to the following flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Various benefits and advantages can be realized with the disclosed aspects. For example, provide herein is an effective way to separate, from existing user browsing history data, browsing activities that are actively intended by users and those that are not. Some methods either give very partial solutions, which do not effectively solve the problem, or require user-side access, which may be expensive and intrusive. The disclosed aspects provide a complete filtering solution, filtering out non-user-intended traffic in proportions consistent with external and internal experiments and studies; does not require user-side access or action; and does not require manual annotation, labeling, or extensive experimentation. Further, the disclosed aspects are robust to coarse aggregation or recording in times and domains in the browsing data; can be easily adapted to desktop/laptop browsing traffic, browsing traffic from specific populations (e.g. those from a particular country), or browsing traffic of various granularities and level of domains; gives output filtering lists that can be easily computed, updated, interpreted, and customized for different use cases.

Other benefits and advantages are that the separation of user- and non-user-intended traffic is an essential first-step for effective mining of the browsing history data from either mobile or desktop/laptop. Without this, insights gathered from naive post-hoc analysis of browsing data may not be accurate, because a predominant proportion of this data is not intended by the users and may not be meaningful.

The filtering, as discussed herein can greatly increase the usability and value of a set of browsing history data and can enhance various applications or products that make use of intelligence derived from it. Examples of such applications include, but are not limited to, user segmentation and profiling, targeted advertising, content or product recommendation, content storage and delivery optimization. Entities that can benefits from the disclosed capabilities include, but are not limited to, entities that own or collect browsing data and are interested in developing data products that have higher values than raw browsing data. Other entities include telecommunication businesses interested in optimizing content delivery through the network; businesses that own and deliver content and are interested in optimizing content recommendation, storage, and delivery, and/or any business that is interested in targeted advertising or recommendations of content, product, event, and so on. The advertising and recommendation can take place either on the platform where the browsing data is collected, or cross-platform (if linkage is possible), which may be especially helpful for profiling new clients who have not interacted extensively with the system of a business to create enough behavioral data.

By way of example and not limitation, the various aspects discussed herein can use mobile browsing history data to inform targeted advertising and recommend shows on various television platforms, and forecast and optimize network delivery of large video content through a network. The browsing history data can be joined with data from various television platforms and locations to provide multi-faceted cross-platform user profiles. Filtering of non-user-intended browsing activity as discussed herein can lead to better results in these efforts.

As internet usage (especially that through mobile) increases rapidly in the coming years, more businesses will come to practice and value the mining of browsing data for an increasingly wider array of applications or products. The disclosed aspects can increase the intelligence content in browsing data, which can lead to better results in these applications.

Figure 2:
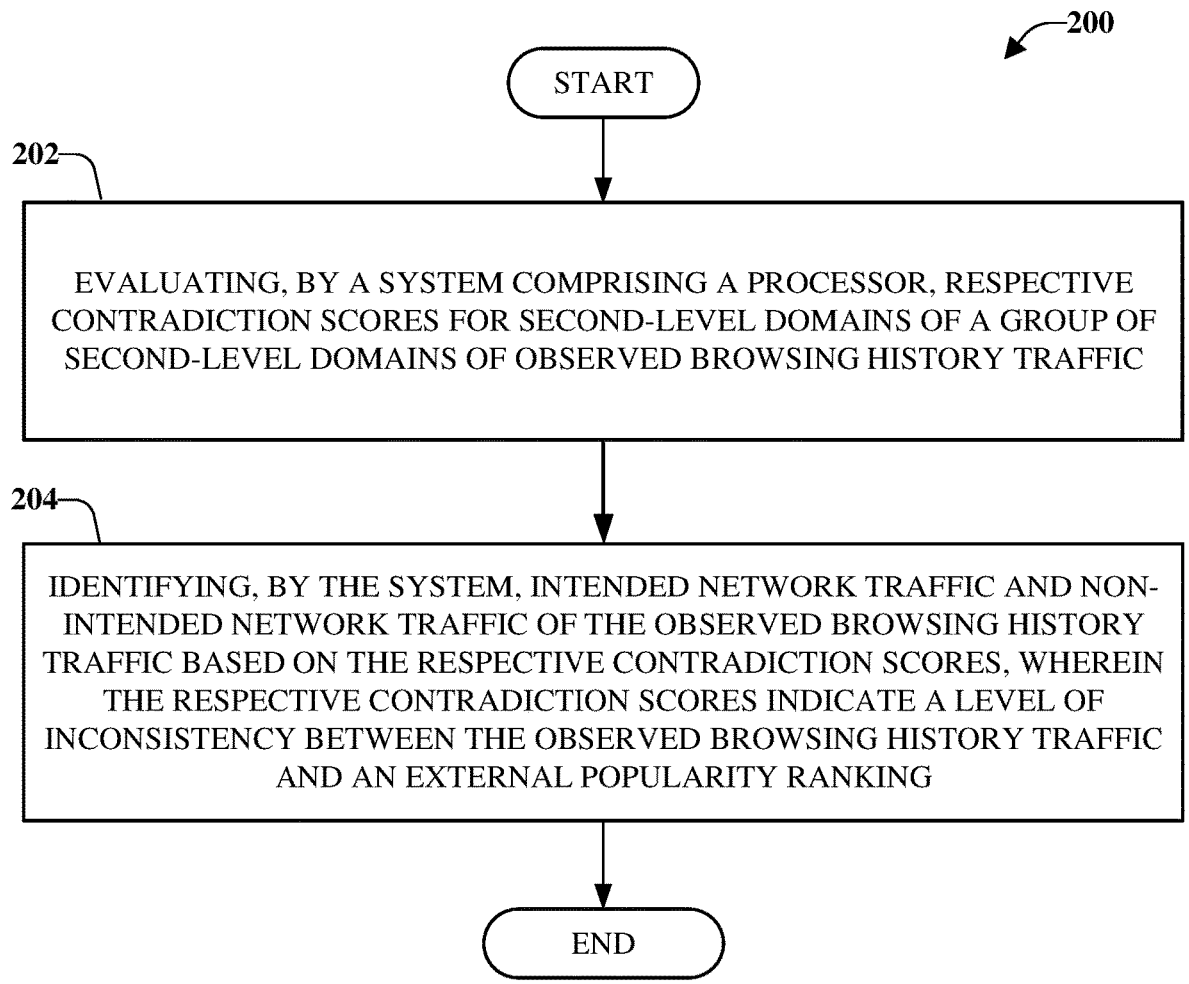
FIG. 2 illustrates an example, non-limiting, method for separating intended and non-intended browsing traffic in accordance with one or more embodiments described herein.

FIG. 2 illustrates an example, non-limiting, method 200 for separating intended and non-intended browsing traffic in accordance with one or more embodiments described herein. The method 200 can be implemented by a system comprising a processor.

As discussed herein, various aspects relate to producing a list of second-level domains (SLD), where visits to these domains and their subdomains are mostly not actively intended by users. The list can be utilized to filter out all traffic to each SLD on this list and its subdomains. The list can be referred to as a "blacklist." It is noted that an SLD is directly below the top-level domain, which is the last part of the domain name. For example, the SLD of www.example_domain.com/example_subdomain is example_domain.com. In another example, the SLD of www.example_subdomain.example_domain.co.uk is example_domain.co.uk.

At the SLD level, some domains and their subdomains can attract a mixture of user-intended and non-user-intended traffic. For example, visits to some subdomains of apple.com may be user intended apple product browsing on its retail page, but a much larger volume of visits to some subdomains may be generated by the iOS operating system background activities for iPhones, such as location tracking and software updates. Without the full URL, it is challenging to tell them apart. Whether or not an SLD is on the output blacklist depends on the proportion of its traffic that is non-user-intended in the average case.

Unavoidably, some small numbers of false positives and false negatives are incurred because the full URL information and the ground truths are not available in some implementations. However, the disclosed aspects still allow for effectively filtering out the bulk of ad, analytics, infrastructure, platform, content delivery networks (CDNs), and operating system background traffic, to reveal a much smaller but a much more informative set of browsing traffic that corresponds to users interests and behaviors.

The method 200 starts, at 202, with evaluating respective contradiction scores for second-level domains of a group of second-level domains of observed browsing history traffic. For example, the observed browsing history traffic can be a subset (e.g., a sample) of the browsing history traffic that is available.

Further, at 204, intended network traffic and non-intended network traffic of the observed browsing history traffic can be identified based on the respective contradiction scores. The respective contradiction scores can indicate a level of inconsistency between the observed browsing history traffic and an external popularity ranking. The intended network traffic information can be retained in a first list (e.g., a whitelist) and the non-intended network traffic information can be retained in a second list (e.g., a blacklist). The lists can be applied to other network traffic.

Figure 3:
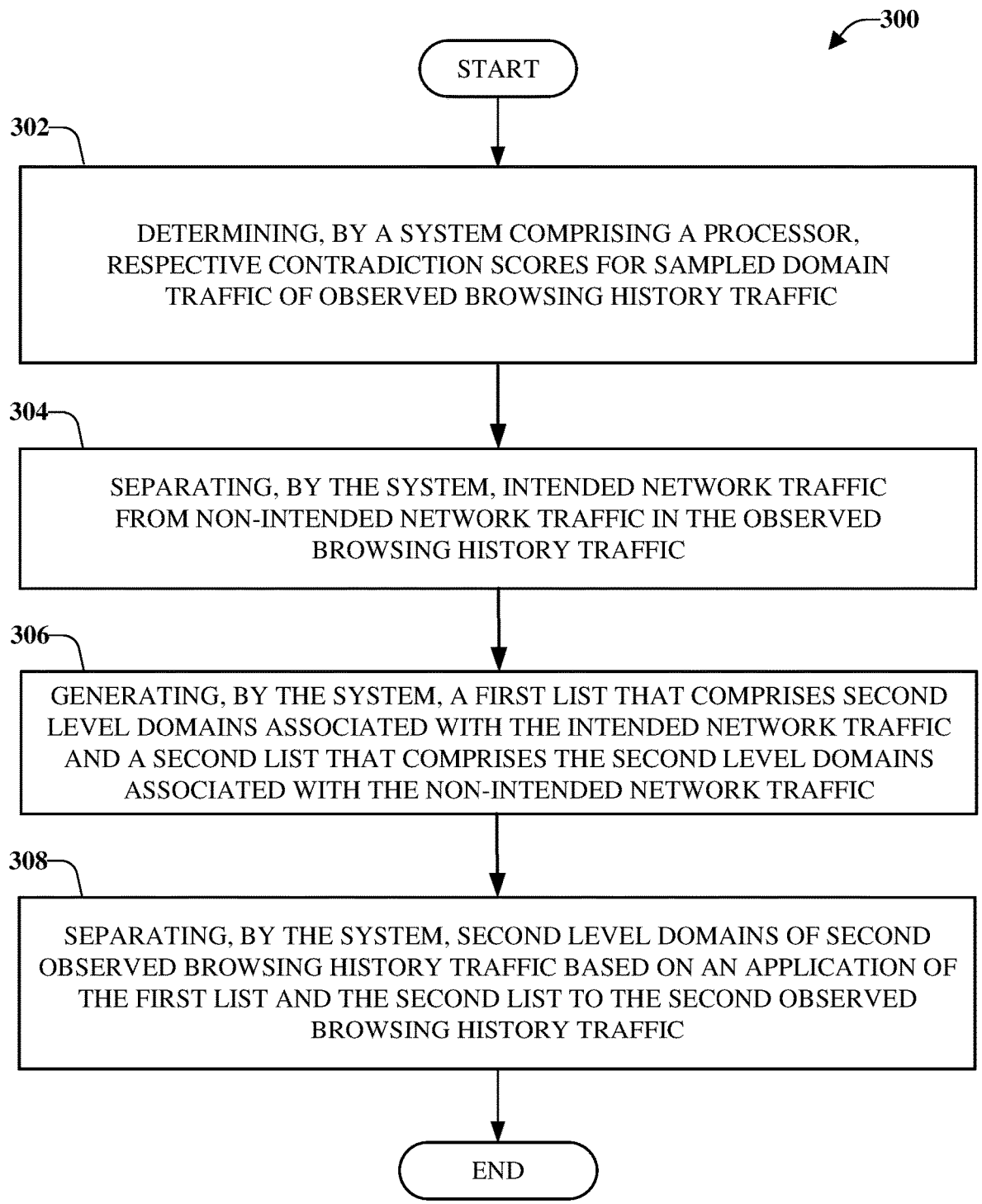
FIG. 3 illustrates an example, non-limiting, method for applying sampled network traffic information to unsampled network traffic information to identify intended and non-intended browsing traffic in accordance with one or more embodiments described herein.

FIG. 3 illustrates an example, non-limiting, method 300 for applying sampled network traffic information to unsampled network traffic information to identify intended and non-intended browsing traffic in accordance with one or more embodiments described herein. The method 300 can be implemented by a system comprising a processor.

At 302 respective contradiction scores for sampled domain traffic of observed browsing history traffic is determined. At 304, intended network traffic is separated from non-intended network traffic in the observed browsing history traffic. Further, at 306, a first list that comprises second level domains associated with the intended network traffic and a second list that comprises the second level domains associated with the non-intended network traffic are generated.

Second level domains of second observed browsing history traffic can be separated, at 308. The separation can be based on an application of the first list and the second list to the second observed browsing history traffic. Thus, the second observed browsing history traffic can be separated into intended network traffic and non-intended network traffic.

Figure 4:
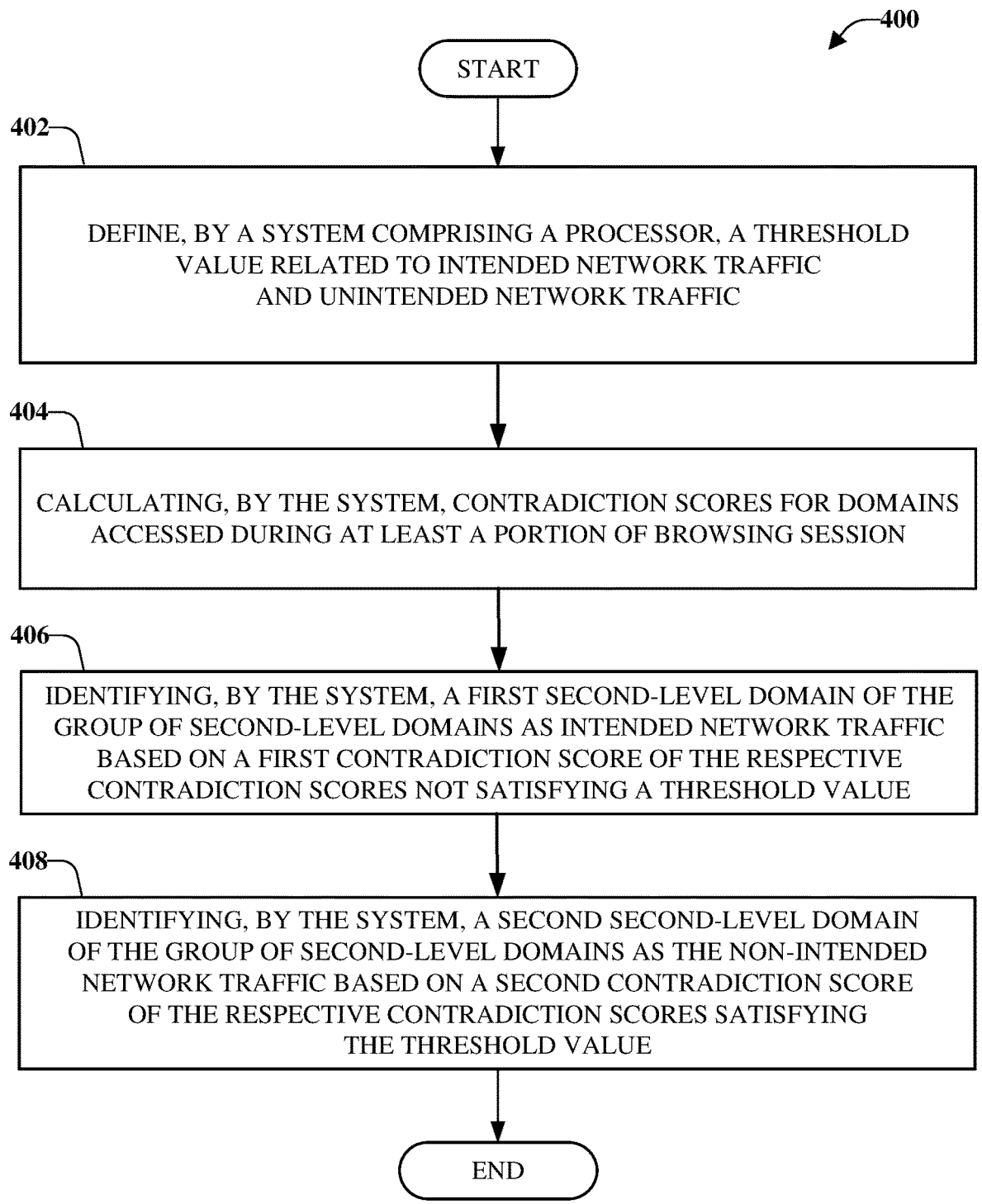
FIG. 4 illustrates an example, non-limiting, method for utilizing a defined value to separate network traffic into intentional network traffic and unintentional network traffic in accordance with one or more embodiments described herein.

FIG. 4 illustrates an example, non-limiting, method 400 for utilizing a defined value to separate network traffic into intentional network traffic and unintentional network traffic in accordance with one or more embodiments described herein. The method 400 can be implemented by a system comprising a processor.

At 402, a threshold value related to intended network traffic and unintended network traffic can be defined. The intended network traffic can be traffic that a user intentionally initiated (e.g., a request to access a website associated with a news organization). The unintended network traffic can be traffic that the user unintentionally initiated (e.g., advertisement websites that are accessed when the news organization website is accessed). According to some implementations, the unintended network traffic can be traffic dynamically accessed by an operating system associated with a user equipment and/or one or more applications that are downloaded on the user equipment and/or that are executing on the user equipment.

According to some implementations, calculated values at or above the defined value can indicate network traffic that is unintended network traffic and calculated values below the defined value can indicate network traffic that is intended network traffic. However, the disclosed aspects are not limited to this implementation. Instead, values at or above the defined value can indicate network traffic that is intended network traffic and calculated values below the defined value can indicate network traffic that is unintended network traffic.

At 404, contradiction scores for domains accessed during at least a portion of a browsing session can be calculated. For example, only a selected portion of a browsing history might be sampled according to the various aspects discussed herein, while other portions of the browsing history are not sampled. However, according to some examples, an entire browsing history is sampled. In other examples, subsets of browsing history associated with two or more sources are sampled.

The one or more browsing sessions, or portions thereof, that are sampled can comprise one or more second-level domains that are accessed and/or attempted to be accessed during the sampling period. A first second-level domain of the one or more second-level domains can be identified, at 406, as intended network traffic based on a first contradiction score of the respective contradiction scores not satisfying a threshold value. Further, at 408, a second second-level domain of the group of second-level domains can be identified as the non-intended network traffic based on a second contradiction score of the respective contradiction scores satisfying the threshold value.

According to an additional or alternative implementation, the first second-level domain can be added to a white list that comprises a listing of second-level domains determined to be associated with intentional network traffic. For example, the second-level domains included in the whitelist can comprise domains that were specifically requested by a user (e.g., an Internet marketplace website, a website for hobbyists, a website that hosts encyclopedic knowledge, and so on).

In accordance with an additional or alternative implementation, the second second-level domain can be added to a blacklist that comprises a listing of second-level domains determined to be associated with unintentional network traffic. For example, the second-level domains included in the blacklist can be domains associated with advertising websites, adware, or other websites not intentionally accessed by the user.

Figure 5:
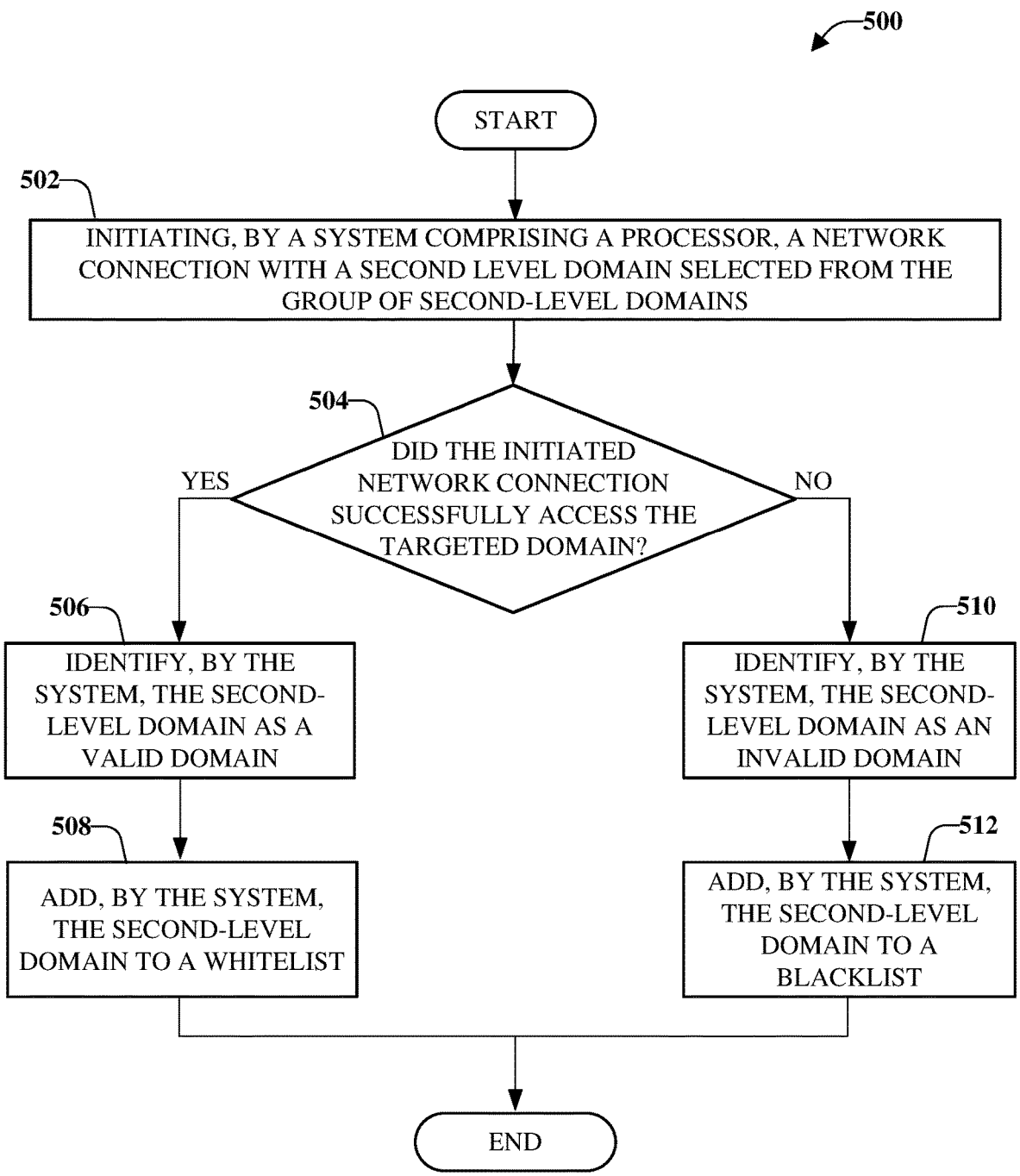
FIG. 5 illustrates an example, non-limiting, method for validating second-level domains identified in observed browsing history traffic in accordance with one or more embodiments described herein.

FIG. 5 illustrates an example, non-limiting, method 500 for validating second-level domains identified in observed browsing history traffic in accordance with one or more embodiments described herein. The method 500 can be implemented by a system comprising a processor.

For the optional implementation that comprises validation of the SLDs, it can be determined whether a connection with an SLD/IP address can be initiated. If not, the SLD can be deemed invalid and included in the output blacklist. The blacklist can have an additional column for a binary flag of whether this SLD/IP address was found to be invalid.

The method 500 starts, at 502, and a network connection can be initiated with a second level domain selected from a group of second-level domains. At 504, a determination can be made whether the initiated network connection successfully accessed the targeted domain. If the targeted domain was successfully accessed ("YES), at 506, the second level domain can be identified as a valid domain. According to some implementations, at 508, the second level domain can be included in a data store that comprises intended network traffic (e.g., a whitelist).

If the determination at 504 is that the targeted domain was not successfully accessed ("NO"), at 510, the second level domain can be identified as an invalid domain. According to some implementations, at 512, the second level domain can be included in a data store that comprises unintended network traffic (e.g., a blacklist).

For example, a list of all unique SLDs/IP addresses can be constructed from the data. Then, it can be determined whether each IP address/SLD is in the cached dictionary of SLD validity. If yes, its corresponding validity status can be read out. If not, do below: If it follows the pattern of an IP address, a determination can be made whether it is a valid IP address. If yes, then it is valid. If no, then it is not valid.

If it follows the pattern of an SLD, a determination can be made whether an http or https connection can be initiated with this SLD (with or without prepending "www." to the SLD). If yes, then it is deemed valid. If no, try a defined number of more times (e.g., nine more times) to initiate the connection. Stop and categorize as valid as soon as one of the attempts is successful; categorize as invalid if it fails all times (e.g., all 10 times in the above example). Cache this {IP address/SLD: valid/invalid} pair into a dictionary (e.g., a data store).

Figure 6:
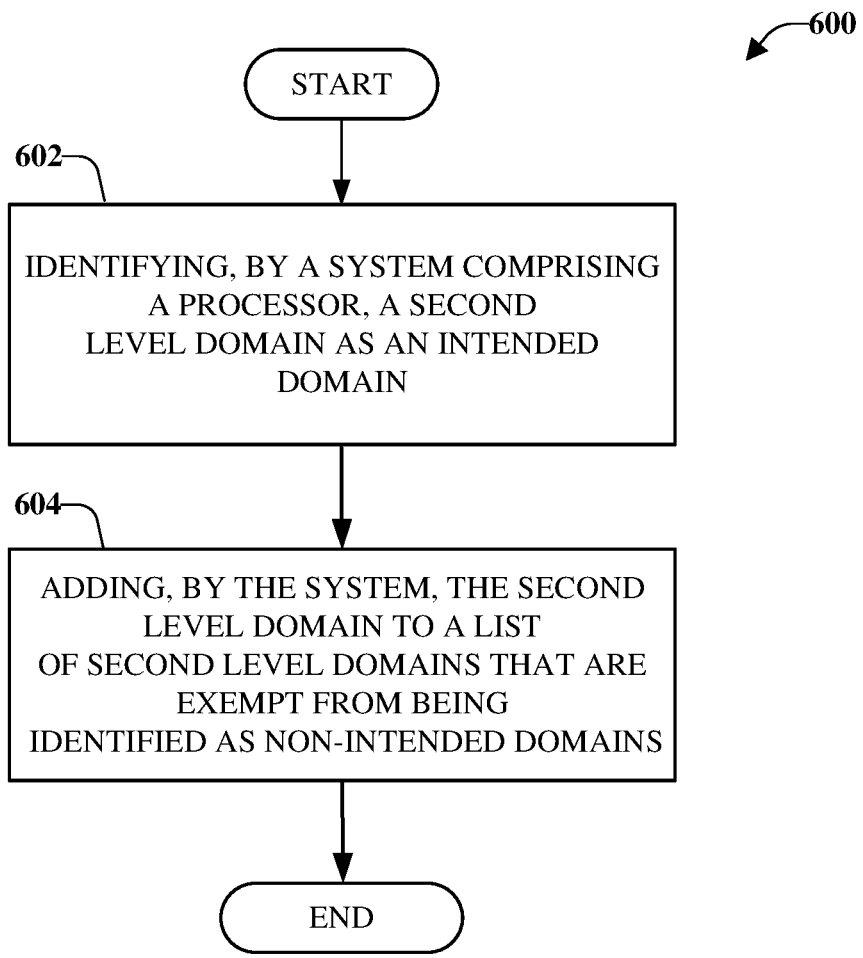
FIG. 6 illustrates an example, non-limiting, method for exempting inclusion of second-level domains in a blacklist in accordance with one or more embodiments described herein.

FIG. 6 illustrates an example, non-limiting, method 600 for exempting inclusion of second-level domains in a blacklist in accordance with one or more embodiments described herein. The method 600 can be implemented by a system comprising a processor. For the optional implementation that exempts one or more SLDs, if traffic and users are being monitored for example_domain.com, for example, this SLD could be explicitly included in a customizable exempt list to make sure that it is not blacklisted.

At 602 of the method 600, a second level domain can be identified as an intended domain. For example, the intended domain can be a domain that the user intended to access (e.g., a website associated with a news network). Various techniques can be utilized to identify the second level domain as the intended domain as discussed herein.

Based on the identification of the second level domain as the intended domain, at 604, the second level domain can be added to a list of second level domains that are exempt from being identified as non-intended domains. The list of exempt domains (as well as the whitelists and/or blacklists discussed herein) can be utilized across various users and browsing traffic.

Figure 7:
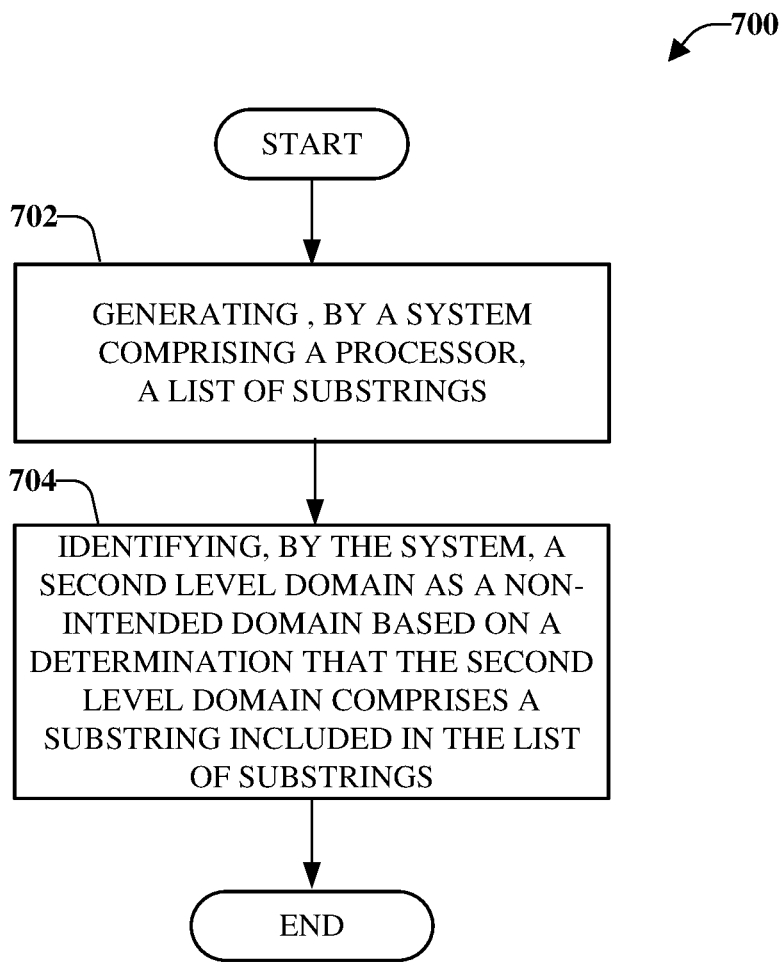
FIG. 7 illustrates an example, non-limiting, method for utilizing a substring match to identify an unintended domain name in accordance with one or more embodiments described herein.

FIG. 7 illustrates an example, non-limiting, method 700 for utilizing a substring match to identify an unintended domain name in accordance with one or more embodiments described herein. The method 700 can be implemented by a system comprising a processor.

For the optional implementation that comprises detection of a bad substring, a way to assess whether an SLD is likely to get mostly non-user-intended traffic is by a substring match (e.g., detect a bad substring). A list of substrings can be built, at 702. Building the list of substrings can depend on the use case. If any of the listed substrings is found within a domain name, the found domain can be included in the blacklist. Examples of such substrings include 'adserver', '-ads', 'ad-', 'ads-', 'analytics', 'cdn,' and so forth. By way of example and not limitation, a simple example of a substring can be the word "advertisement" or variants thereof. Therefore, if a domain includes the word "advertisement" or variants thereof that domain can be identified as a non-intended domain, at 704. Accordingly, various listings (e.g., blacklists) can be created without the need to perform evaluation beyond the domain name.

Figure 8:
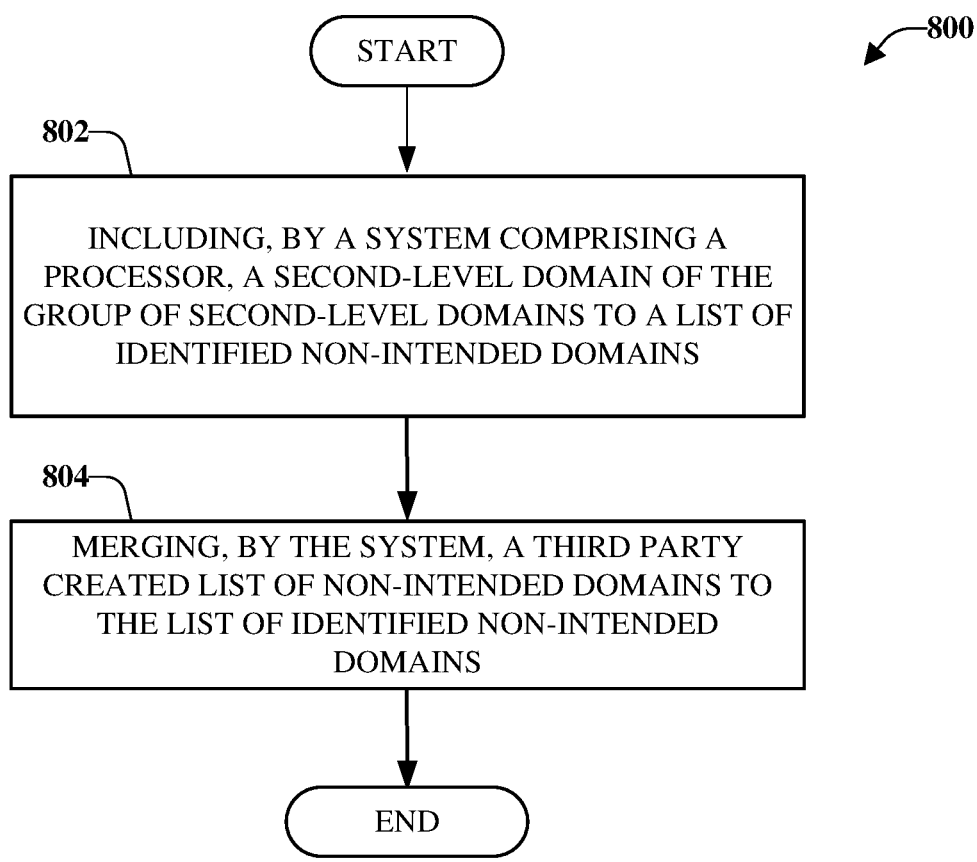
FIG. 8 illustrates an example, non-limiting, method for combining a determined blacklist with one or more external lists to create a merged list in accordance with one or more embodiments described herein.

FIG. 8 illustrates an example, non-limiting, method 800 for combining a determined blacklist with one or more external lists to create a merged list in accordance with one or more embodiments described herein. The method 800 can be implemented by a system comprising a processor.

According to another optional implementation, the blacklist can be combined (union) with one or more external lists that aim to capture aspects of what is targeted to be filtered out. Thus, at 802, a second-level domain of the group of second-level domains can be included in a list of identified non-intended domains. Thereafter, at 804, a third party created list of non-intended domains can be merged with the list of identified non-intended domains.

For example, an ad server list from an internal (or external) source could be targeted to be fielded out. As previously mentioned, these lists tend to be partial and relying only on them is not enough. Combining the list with one or more blacklist obtained through the various aspects discussed herein, can enhance the one or more blacklists.

As discussed herein, a contradiction score can be computed for each SLD that indicates how likely this SLD attracts mostly non-user-intended traffic. This score computes a measure of inconsistency between empirical prevalence observing in browsing history data and external popularity rankings.

The contradiction score can be calculated by a formula designed so that only domains heavily visited by non-user-intended traffic give high contradiction scores. A cutoff is chosen and all SLDs whose scores are higher than the cutoff can be included in the output blacklist. The higher the contradiction score, the more confidence that traffic to this SLD is mostly non-user intended.

After computing the contradiction score, there are also optional steps to perform the following. Validate the SLD to determine whether it is a valid IP address or whether HTTP or HTTPS connection can be successfully established with the SLD. Detect bad substring (e.g. "advert," "ads-" and so on) from a customizable bad substring list. Combine with external ad-server list (e.g., from an external source, from a third-party source). Exempt some SLDs. For example, if traffic and users are being monitored for example_domain.com, this domain can be explicitly included in a customizable exempt list to make sure that it is not blacklisted.

As discussed herein, user-intended and non-user intended traffic can be separated in post-hoc browsing traces. The disclosed aspects can yield a much more complete list of non-user-intended domains as compared to other methods. For example, the lists created can identify approximately 80% to around 90% of the traffic as non-user-intended, closely in line with conclusions from internal experiments and external studies. Other lists can identify only about 10% to around 20% of traffic; do not list some major ad servers, do not list domains that generate third party requests other than ad servers (e.g., analytics and tracking, social media tools), and do not list domains that generate passive system requests (e.g., geo-positioning and configuration).

Further, the disclosed aspects can process existing browsing histories without needing user-side access. For example, a number of tools and browser plug-ins allow users to examine and selectively block certain third-party requests.

However, these tools need user-side installations and actions. On the other hand, the disclosed aspects do not need user-side access or user action at all, and enables separation of user-intended traffic from an existing dataset of browsing history. In addition to the above advantages, the disclosed aspects are easy to generalize, and the output blacklist is easy to update, interpret, and customize.

The disclosed aspects are generalizable and can easily be adapted to desktop/laptop browsing traffic, and browsing traffic from countries other than the United States. Any independent domain popularity ranking can be used as long as its quality is reasonable. The disclosed aspects can also be easily extended to develop a more granular output list of domains at lower levels than SLDs, if finer domain information is available.

The output list is easy to output. For example, the output blacklist can be recomputed and updated as often as desired. Domain names and especially names of third-party request domains do evolve over time, but not very frequently. From various experiments conducted, updating once every three months could be sufficient. However, more frequent, or less frequent, updates can occur in accordance with the various aspects discussed herein. Each update computation is very fast.

In addition, the output list is interpretable and customizable. The output blacklist includes for each SLD its contraction score value, and its binary flags (if done) for invalid SLD, bad substrings, and membership in external ad-server list. This additional information suggests why each SLD is on the list and the confidence level related to its relevance on the list. This allows for further customization for different use cases (e.g. making the list more lenient or aggressive). It is noted that the quality of user segmentation and profiling for various use cases improves considerably after the non-user-intended traffic is filtered out using a blacklist constructed by the disclosed aspects.

Described herein are systems, methods, articles of manufacture, and other embodiments or implementations that can facilitate separating intended and non-intended browsing traffic in browsing history for advanced networks. Facilitating generic reciprocity-based channel state information acquisition frameworks for advanced networks can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (RAN) can enable the implementation of concepts such as Software-Defined Network (SDN) and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of Policy and Charging Rules Function (PCRF) network elements so that policies such as quality of service and traffic management and routing can be synchronized and managed end to end.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously (or concurrently) to tens of workers on the same office floor, several hundreds of thousands of simultaneous (or concurrent) connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Figure 9:
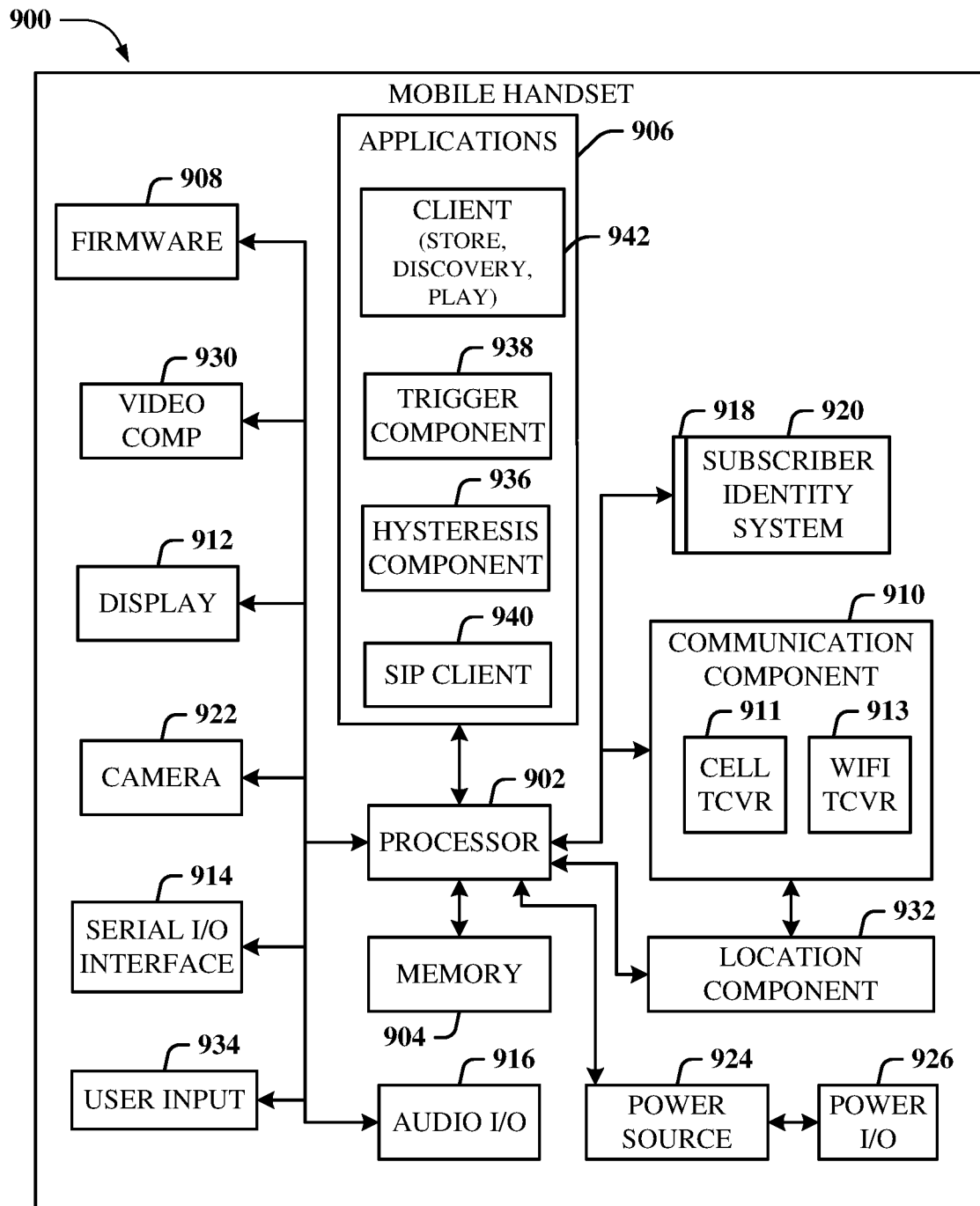
FIG. 9 illustrates an example block diagram of an example mobile handset operable to engage in a system architecture that facilitates wireless communications according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touchscreen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
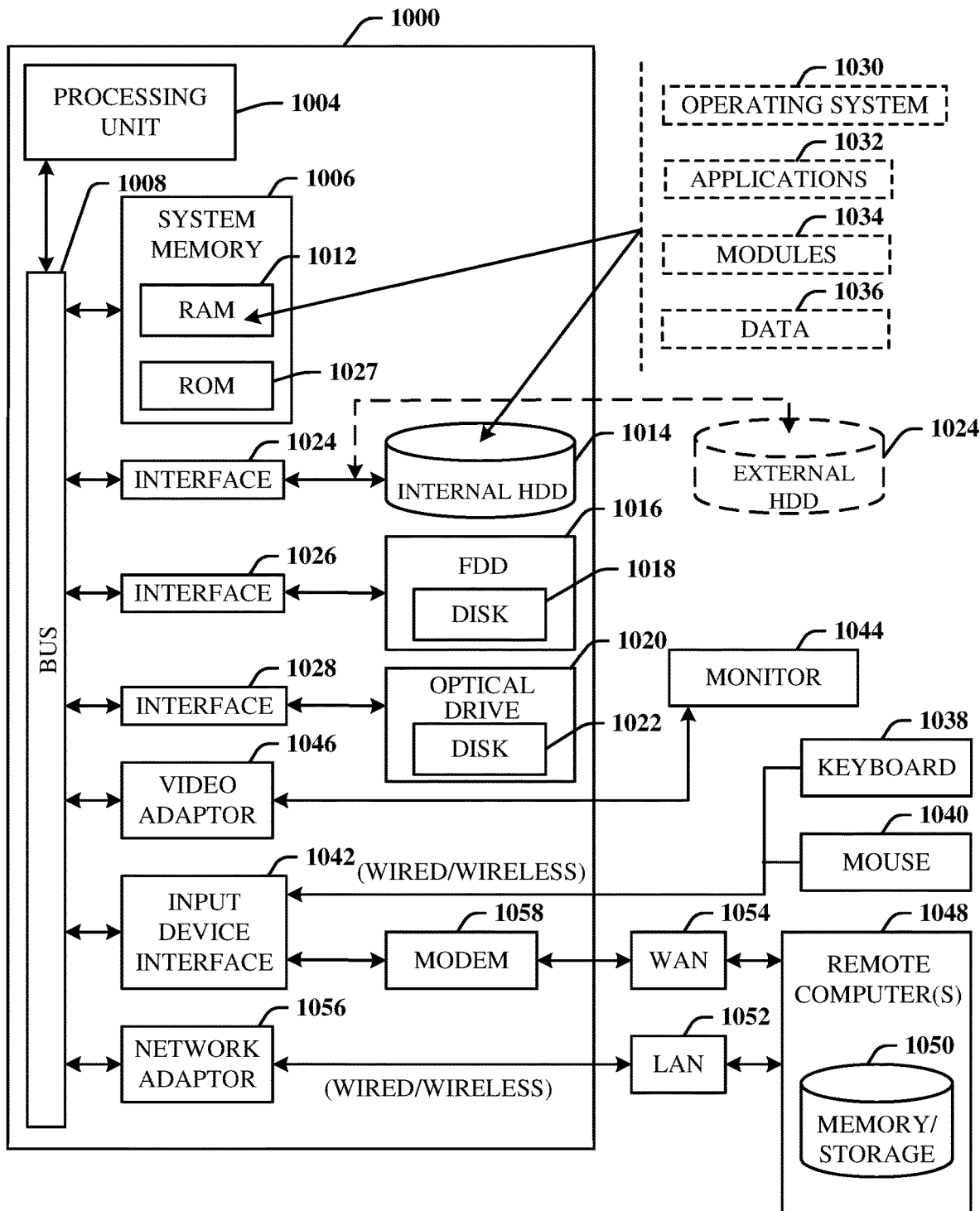
FIG. 10 illustrates an example block diagram of an example computer operable to engage in a system architecture that facilitates wireless communications according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touchscreen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 9 Mbps (802.11a) or 54 Mbps (802.11b) data rate, for example, or with products that contain both bands (dual band), so the networks can provide real-world performance similar to the basic 16BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of ⅓ with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a processor; and
a memory that stores executable instructions that, when executed by the processor, facilitate performance of operations, comprising:
determining respective contradiction values for second-level domains of a group of second-level domains in observed browsing history traffic; and
separating the observed browsing history traffic into intended network browsing traffic and non-intended network browsing traffic based on the respective contradiction values,
wherein the intended network browsing traffic comprises information related to user-initiated browsing behavior, and wherein the non-intended network browsing traffic comprises background activity void of the information related to the user-initiated browsing behavior, and
wherein the respective contradiction values indicate levels of inconsistency between respective popularities of the second-level domains and associated subdomains in the observed browsing history traffic and determined respective popularity rankings of the second-level domains.

2. The system of claim 1, wherein the separating comprises identifying a second-level domain of the group of second-level domains as the non-intended network browsing traffic based on a contradiction value for the second-level domain determined to be above a threshold level.

3. The system of claim 2, wherein the operations further comprise:
adding the second-level domain to a list of identified non-intended domains, and
utilizing the list to facilitate the separating the intended network browsing traffic from the non-intended network browsing traffic.

4. The system of claim 1, wherein the determining comprises evaluating the respective popularities of the second-level domains and associated subdomains in the observed browsing history data and respective third-party popularity rankings of the second-level domains.

5. The system of claim 1, wherein the operations further comprise:
initiating a network connection with a second level domain selected from the group of second-level domains; and
determining the second level domain is a valid second level domain based on a successful network connection with the second level domain.

6. The system of claim 1, wherein the operations further comprise:
initiating a network connection with a second level domain selected from the group of second-level domains;
determining the second level domain is an invalid second level domain based on an unsuccessful network connection with the second level domain; and
adding the second level domain to a list of identified non-intended domains, wherein the list is utilized to facilitate the separating the intended network traffic from the non-intended network browsing traffic.

7. The system of claim 1, wherein the operations further comprise:

identifying a second level domain as an intended domain; and adding the second level domain to a list of second level domains that are exempted from being identified as non-intended domains.

8. The system of claim 1, wherein the operations further comprise:

generating a list of substrings; and identifying a second level domain as a non-intended domain based on a determination that the second level domain comprises a substring included in the list of substrings.

9. The system of claim 1, wherein the operations further comprise:

including a second-level domain of the group of second-level domains to a list of identified non-intended domains; and merging a third party created list of non-intended domains with the list of identified non-intended domains.

10. The system of claim 1, wherein the observed browsing history traffic is a sample of available browsing history traffic, and wherein the operations further comprise:

including the second-level domains associated with the non-intended network browsing traffic in a first data store and the second-level domains associated with the intended network browsing traffic in a second data store;

applying the first data store and the second data store to other available browsing history traffic not including the sample of available browsing history traffic; and separating the other available browsing history traffic into the intended network browsing traffic and the non-intended network browsing traffic.

11. A method, comprising:

evaluating, by a system comprising a processor, respective contradiction scores for second-level domains of a group of second-level domains of observed browsing history traffic; and identifying, by the system, intended network browsing traffic and non-intended network browsing traffic of the observed browsing history traffic based on the respective contradiction scores, wherein the respective contradiction scores indicate a level of inconsistency between the respective popularities of second-level domains of the group of second-level domains and associated subdomains in observed browsing history traffic and respective external popularity rankings of the second-level domains, and wherein the identifying comprises determining that the intended network browsing traffic is generated based on a specified request and that the non-intended network browsing traffic is generated based on a passive request.

12. The method of claim 11, wherein the observed browsing history traffic is first observed browsing history traffic, and wherein the method further comprises:

generating, by the system, a first list that comprises second level domains associated with the intended network browsing traffic and a second list that comprises the second level domains associated with the non-intended network browsing traffic; and separating, by the system, the second level domains of second observed browsing history traffic based on an application of the first list and the second list to the second observed browsing history traffic.

13. The method of claim 12, further comprising:

identifying, by the system, a first second-level domain of the group of second-level domains as the intended network browsing traffic based on a first contradiction score of the respective contradiction scores not satisfying a threshold value; and identifying, by the system, a second second-level domain of the group of second-level domains as the non-intended network browsing traffic based on a second contradiction score of the respective contradiction scores satisfying the threshold value.

14. The method of claim 11, wherein the evaluating comprises evaluating respective popularities of the second-level domains and associated subdomains in the observed browsing history data and the respective external popularity rankings of the second-level domains.

15. The method of claim 11, further comprising:

generating, by the system, a list of substrings; and identifying, by the system, a second level domain as a non-intended domain based on a determination that the second level domain comprises a substring included in the list of substrings.

16. The method of claim 11, further comprising:

including, by the system, a second-level domain of the group of second-level domains to a list of identified non-intended domains; and merging, by the system, an external list of non-intended domains to the list of identified non-intended domains.

17. The method of claim 11, further comprising:

initiating, by the system, a network connection with a second level domain selected from the group of second-level domains;

determining, by the system, the second level domain is a valid second level domain based on a successful network connection with the second level domain or is an invalid second level domain based on an unsuccessful network connection with the second level domain; and adding, by the system, the invalid second level domain to a list of identified non-intended domains, wherein the list is utilized to facilitate the separating the intended network traffic from the non-intended network browsing traffic.

18. The method of claim 11, further comprising:

identifying, by the system, a second level domain as an intended domain; and adding, by the system, the second level domain to a list of second level domains that are exempted from being identified as non-intended domains.

19. A non-transitory machine-readable medium, comprising executable instructions that, when executed by a processor, facilitate performance of operations, comprising:

determining, for a first user equipment selected from a group of user equipment associated with a network, respective contradiction values for first domains of first browsing history traffic;

identifying the first domains as a first group of domains and a second group of domains, wherein the first group of domains comprises domains associated with intentional network traffic, and wherein the second group of domains comprises domains associated with unintentional network traffic, wherein the intentional network traffic is actively initiated based on user input to the first user equipment, and wherein the unintentional network traffic comprises non-user requests initiated by an operating system of the first user equipment; and applying the first group of domains and the second group of domains to second browsing history traffic associated with a second user equipment selected from the group of user equipment, wherein the respective contradiction scores indicate a level of inconsistency between respective popularities of the first domains and associated subdomains in the first browsing history traffic and respective external popularity rankings of the first domains.

20. The non-transitory machine-readable medium of claim 19, wherein the operations further comprise:

generating a whitelist that comprises the first group of domains and a blacklist that comprises the second group of domains; and applying the whitelist and the blacklist to user equipment in the group of user equipment, comprising the second user equipment, wherein the group of user equipment is configured to operate according to a fifth generation communications network protocol.

\* \* \* \* \*